No. 654,128. Patented July 24, 1900.
J. C. BIOREN.
BICYCLE LOCK.
(Application filed Sept. 28, 1899.)
(No Model.) 2 Sheets—Sheet 1.
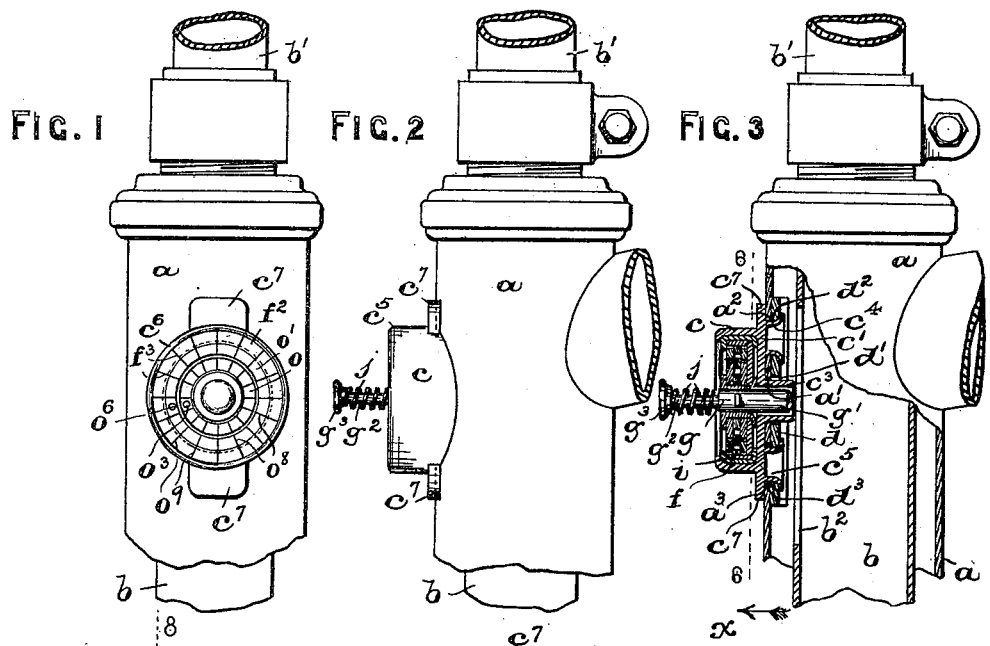
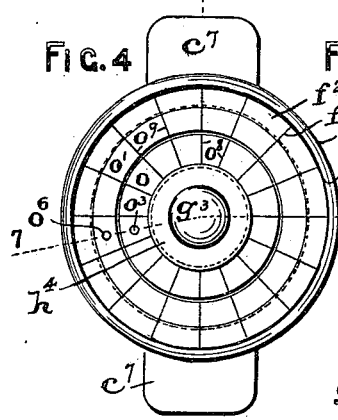
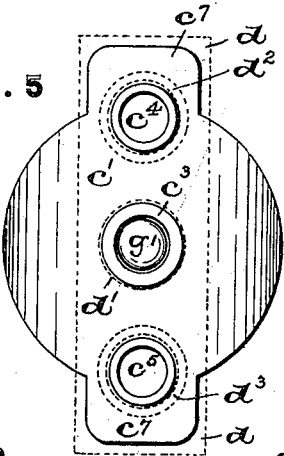
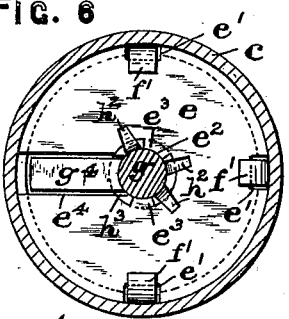
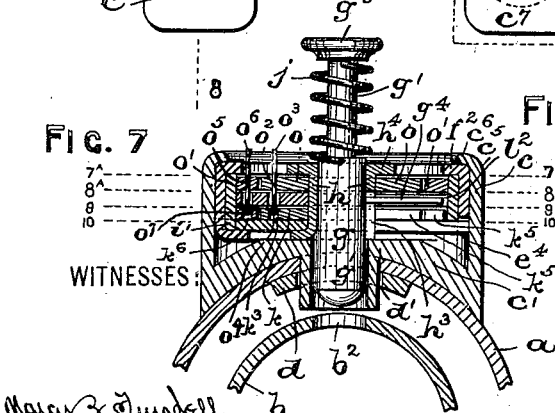
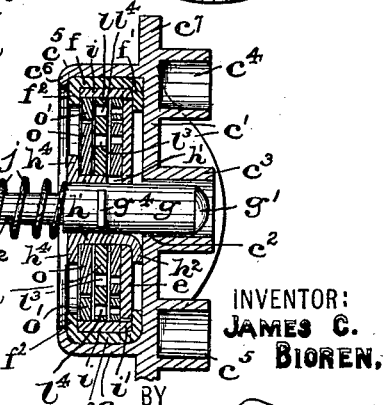
WITNESSES
INVENTOR:
JAMES C. BIOREN,
BY Fred'k C. Fraentzel
ATTORNEY
THE NORRIS PETERS CO., PHOTO-LITHO., WASHINGTON, D. C.

No. 654,128. Patented July 24, 1900.
J. C. BIOREN.
BICYCLE LOCK.
(Application filed Sept. 28, 1899.)
(No Model.) 2 Sheets—Sheet 2.
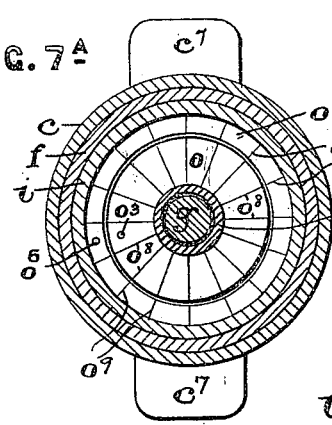
FIG. 7ᴬ
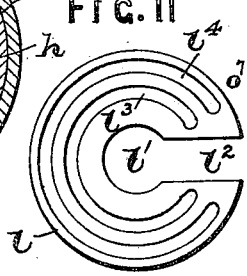
FIG. 11
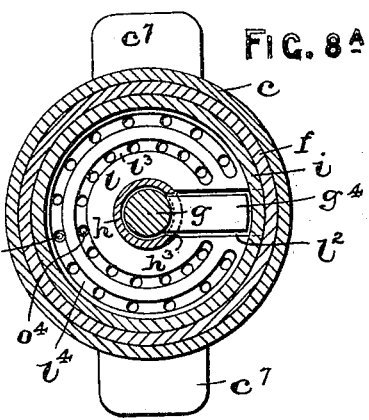
FIG. 8ᴬ
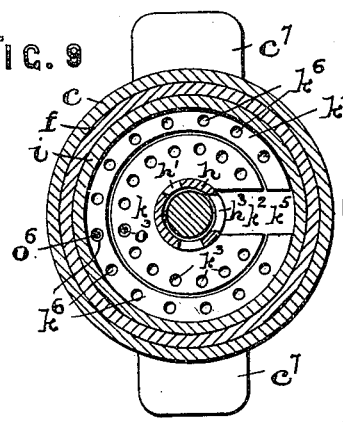
FIG. 9
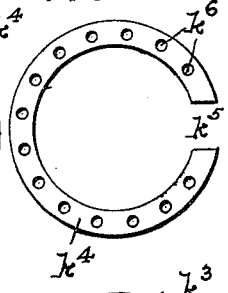
FIG. 12
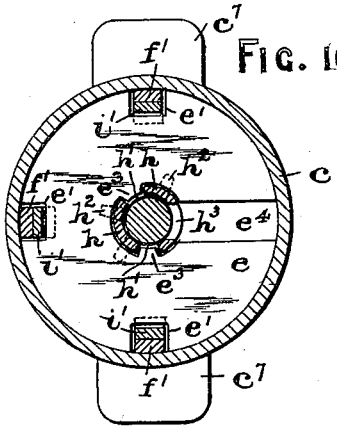
FIG. 10
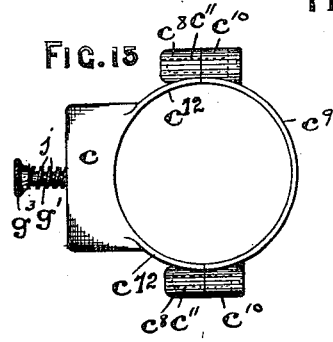
FIG. 15
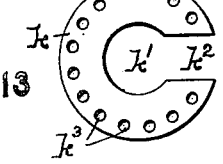
FIG. 13
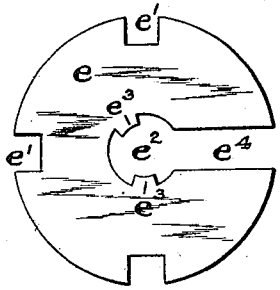
FIG. 14
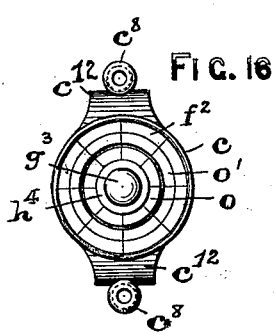
FIG. 16
WITNESSES:
Harry Martin
Nancy Z. Truskell
INVENTOR:
JAMES C. BIOREN,
BY Fredk. Fraentzel,
ATTORNEY

UNITED STATES PATENT OFFICE.

JAMES C. BIOREN, OF NEWARK, NEW JERSEY.

BICYCLE-LOCK.

SPECIFICATION forming part of Letters Patent No. 654,128, dated July 24, 1900.

Application filed September 28, 1899. Serial No. 731,907. (No model.)

*To all whom it may concern:*

Be it known that I, JAMES C. BIOREN, a citizen of the United States, residing at Newark, in the county of Essex and State of New Jersey, have invented certain new and useful Improvements in Bicycle-Locks; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has reference to improvements in locks for bicycles, tricycles, and other like vehicles provided with tubular frame portions movably arranged within each other, whereby such parts may be brought in locked or unlocked relation with each other.

The primary object of my invention, therefore, is to provide a novel construction of locking means whereby the rider, after he has dismounted, can bring the fork-tube and tubular head of the vehicle in fixed relations one with the other, and thereby prevent the turning of said parts unless the locking mechanism is released from such holding contact with the handle-bar tube.

A further object of this invention is to provide a locking mechanism for bicycles and the like which cannot be picked by a thief or unlocked by means of a duplicate key, the locking mechanism forming a permutation-lock the parts of which can be easily and quickly manipulated by the holder of the combination at which the parts of the lock are fixed.

Furthermore, my invention has for another object to provide a locking means whereby the fork-tube can be locked to prevent the steering of the vehicle and render it unfit for use and to provide a simple, neat, and convenient device which can be readily applied to any of the well-known constructions of bicycles and other similar vehicles.

Other objects not here specifically set forth will be evident from the following description of my novel construction of bicycle-lock.

With these several objects in view my invention consists in the novel construction of bicycle-lock to be hereinafter fully described and claimed and also in the several novel arrangements and combinations of the parts thereof, as well as in the details of the construction of such parts, all of which will be more fully specified in the accompanying specification and finally embodied in the clauses of the claim.

The invention is clearly illustrated in the accompanying drawings, in which—

Figure 1 is a front elevation of my novel construction of bicycle-lock in position on the hollow or tubular head of the vehicle. Fig. 2 is a side view of the several parts represented in Fig. 1; and Fig. 3 is a vertical section of the bicycle-lock embodying the principles of my present invention, illustrating in section one means of securing the lock in position against the tubular head, with its bolt about to enter the slotted fork-tube. Fig. 4 is a face view, on an enlarged scale, of the lock before it is attached in position against the head. Fig. 5 is a back view of said lock, indicating in dotted outline the position of a plate-like washer employed in connection with parts of the lock for securing it in the positions on the head indicated in said Figs. 1, 2, and 3; and Fig. 6 is a cross-section taken on line 6 6 in Fig. 3 looking in the direction of arrow *x*, said section, however, being made on an enlarged scale. Fig. 7 is a vertical section taken on line 7 7 in Fig. 4, and Fig. 8 is a similar section taken on line 8 8 in said Fig. 4. Fig. 7$^A$ is a horizontal section taken on line 7$^A$ 7$^A$ in Fig. 7. Fig. 8$^A$ is a similar section taken on line 8$^A$ 8$^A$ in said Fig. 7. Fig. 9 is a horizontal section taken on line 9 9 in said Fig. 7, and Fig. 10 is a like section taken on line 10 10 in said Fig. 7. Figs. 11, 12, 13, and 14 are plan views of the respective parts of the lock mechanism. Figs. 15 and 16 are a side and face view, respectively, of a bicycle-lock made according to my invention, but provided with a modified form of casing and means for fastening it to the frame of the vehicle.

Similar letters of reference are employed in all of the said above-described views to indicate corresponding parts.

Referring to the said drawings, *a* indicates the tubular head, *b* the fork-tube, and *b'* a portion of the handle-bar tube of any of the well-known forms of bicycles or other like vehicles. The said tube *a* is provided, as will be seen from an inspection of Fig. 3, with three holes or openings $a'$, $a^2$, and $a^3$, all for the purpose to be hereinafter more fully set forth, while the inner tube $b$ is provided with an opening $b^2$, preferably in the form of a long slot.

My novel form of locking device consists, essentially, of a suitably-shaped casing $c$, preferably of a cylindrical shape, which is provided with back $c'$, having a central hole $c^2$. Upon the outer and curved surface of said back $c'$, surrounding the said hole $c^2$, is an annular flange $c^3$, which extends into and through said hole or opening $a'$ in the tube $a$. The said back $c'$ of the casing $c$ is also provided with a pair of cylindrically-shaped socket projections $c^4$ and $c^5$, which are passed through the respective holes or openings $a^2$ and $a^3$ in said tube $a$. To secure the said casing in its fixed position against the outer surface of the tube $a$, I have provided a plate-like washer $d$, (see Fig. 3 and dotted outline in Fig. 5,) the said plate having a central opening $d'$, to be fitted over the annular flange $c^3$ of the casing $c$, and a pair of other openings $d^2$ and $d^3$, which are to be respectively fitted over the said socket-shaped projections $c^4$ and $c^5$, hereinabove mentioned. In this manner when the said plate $d$ has been fitted over said parts $c^3$, $c^4$, and $c^5$, projecting through the respective holes or openings in the tube $a$ and against the inner surface of said tube $a$, as indicated in Figs. 3 and 7, by means of a suitable tool which is caused to bear against the projecting edges of said projections $c^4$ and $c^5$, the circumferential edges of the said projection can be upset and firmly closed down into and around the countersunk holes $d^2$ and $d^3$ in the plate $d$, as clearly illustrated, thereby securely connecting the casing $c$ with the tube $a$, as will be clearly evident. The lock mechanism proper, which is arranged within the said casing $c$, comprises a disk $e$, provided around its peripheral edge with one or more cut-away portions or recesses $e'$ and a central opening $e^2$. Said opening $e^2$ is of a circular configuration; but the disk $e$ has one or more tongues or lugs $e^3$, which extend toward the center of said opening $e^2$, and $e^4$ is a radially-arranged slot or opening which extends from the central opening $e^2$ to the outer peripheral edge of said disk $e$. The maximum diameter of the said disk $e$ is practically equal to the inner diameter of the casing $c$ to enable the disk $e$ to be easily and properly fitted in the bottom of the casing $c$, substantially as illustrated. Fitted within said casing $c$ and arranged directly upon said disk $e$ is a ring $f$, which is provided with one or more tongues or lugs $f'$, adapted to be arranged in the corresponding cut-away portion or portions $e'$ in the said disk $e$, to be turned against the under side of said disk $e$, whereby said disk and ring $f$ are secured together, as illustrated in Figs. 6, 7, and 8 of the drawings. The said ring $f$ is also provided at its upper edge with an inwardly-extending annular flange or projection $f^2$, which is provided with radially-arranged lines $f^3$, forming suitable divisions upon the outer surface of said flange $f^2$, as clearly illustrated and for the purposes hereinafter set forth. As shown in the several figures of the drawings, the said shell or casing $c$ has its upper edge $c^5$ slightly turned inwardly and partly against said annular flange $f^2$, as at $c^6$, whereby the said ring $f$ and the disk $e$, to which it is secured, as above set forth, are operatively arranged and held in position in the casing $c$. It will also be noted that the said shell $c$ may be provided with oppositely-extending ears or portions $c^7$, which are curved upon their back so as to correspond to the curvature of the back $c'$. Thus when the said casing is arranged upon the outer cylindrical surface of the said tube $a$ the said ears or portions $c^7$ will also fit snugly against said surface of the tube $a$ and tend to more rigidly secure the casing $c$ in position by presenting a greater bearing-surface. Within said casing $c$ is a central pin or bolt $g$, having its one end $g'$ normally extending into the hole $c^2$ in the back $c'$ of the casing $c$ and into the tubular part of the flange $c^3$, the said pin or bolt having a reduced portion $g^2$ and a finger-piece $g^3$, substantially as shown. Concentric with a part of said pin or bolt $g$ is a sleeve $h$, which is cut away or recessed, as at $h'$, to receive the interlocking lugs or tongues $e^3$ of the disk $e$ to prevent the turning of said sleeve $h$ upon said disk $e$, said sleeve also having an arrangement of lugs or ears $h^2$, which extend through the hole $e^2$ in said disk $e$ and are bent over against the back of the latter, substantially as illustrated in Figs. 6 and 10 of the drawings. The said sleeve $h'$ also has a slot $h^3$, (see more particularly Figs. 6, 7, 8$^A$, 9, and 10,) into and through which projects an arm $g^4$ on said pin or bolt $g$ at right angles therefrom, or approximately so. The said sleeve $h$ also has an annular shoulder or projection $h^4$, and encircling the reduced portion of the pin or bolt $g$, between the finger-piece $g^3$ and the upper surface of said shoulder $h^4$, is a spring $j$, which tends to normally hold the bolt or pin $g$ and its arm $g^4$ in the position indicated in the several figures of the drawings.

As clearly illustrated in the several figures of the drawings, I have placed within the ring $f$ a second ring $i$, which is held in position by the flange $f^2$ of said ring $f$ and is prevented from turning upon the disk $e$ and within the ring $f$ by an arrangement of one or more lugs or projections $i'$, which fit into the recessed or cut-away parts $e'$ in the disk $e$ and directly in front of the lugs or tongues $f'$ of the ring $f$, as clearly indicated in Fig. 10. Within said ring $i$ and concentric with the sleeve $h$ is a disk or circular plate $k$, provided with a central opening $k'$, so as to fit said sleeve $h$, and a cut-away or open portion $k^2$, which is of the same width as the opening or slot $e^4$ in the disk $e$. Said disk $k$ is also provided with an arrangement of any desirable number of small holes or perforations $k^3$, which are all concentric with the center of said disk. Concentric with the said disk or plate $k$ is a ring $k^4$, which is provided with a cut-away part $k^5$, corresponding to the cut-away part $k^2$ in the disk $k$ and to the opening or slot $e^4$ in the disk $e$. The said ring $k^4$ is also provided with a series of holes or perforations $k^6$, which correspond in number to the number of holes in the disk $k$ and are placed upon the same lines radiating from the center of said disk $k$. It will thus be seen that the disk $k$ and the ring $k^4$ are movably arranged independent from each other upon the disk $e$, the said disk being capable of rotation about the sleeve $h$, and the ring $k^4$ being capable of rotation about the said disk $k$. Concentric with said sleeve $h$ and secured in any suitable manner within the ring $i$ and directly above said disk $k$ and the ring $k^4$ is a plate $l$, provided with a central opening $l'$, so as to fit the sleeve $h$. Said plate $l$ has a cut-away portion $l^2$, which is of the same width as the opening or slot $e^4$ in the disk $e$ and also the cut-away part $k^2$ in the disk $k$ and the cut-away part $k^5$ in the ring $k^4$. In this opening $l^2$ of the plate $l$ the arm $g^4$ is normally arranged, as indicated in Fig. 7, the width of said arm being slightly less than the width of the said several open portions $e^4 k^2$ and $k^5$ and $l^2$ for the purpose hereinafter set forth. The said plate $l$ is also provided with a pair of circular and concentric slots or openings $l^3$ and $l^4$, (see Fig. 11,) which when the parts are assembled are in positions corresponding, respectively, to the arrangement of the holes or perforations $k^3$ and $k^6$, as illustrated in Figs. 8 and 8$^A$. Directly above said plate $l$ and beneath the flange or shoulder $h^4$ of the sleeve $h$ is a circular disk $o$, arranged on said sleeve, and $o'$ is a ring which is concentric with the disk $o$, being capable of independent movement upon the disk $l$ and about the disk $o$ and being retained in place in the casing $c$ by the projecting annular edge $f^2$ of the ring $f$. The said disk $o$ has a pin or stud $o^2$ secured thereto in any well-known manner, which has an upwardly-projecting finger-piece $o^3$ and has its lower end portion $o^4$ loosely arranged in the circular slot $l^3$ in the disk $l$ and extending into one of the holes or perforations $k^3$ in the disk $k$, while the ring $o'$ has secured thereto in any well-known manner a pin or stud $o^5$, having an upwardly-extending finger-piece $o^6$ and having its lower end portion $o^7$ loosely arranged in the circular slot $l^4$ of the disk $l$ and extending into one of the holes or perforations $k^6$ in the ring $k^4$. The said disk $o$ is provided upon its outer surface with radial lines $o^8$, and the ring $o'$ has similarly-arranged radial lines $o^9$, all forming divisions corresponding in number to the number of holes or perforations in the disk $k$ and ring $k^4$. In these divisions in said disk $o$, the ring $o'$, and the part $f^2$ of the ring $f$ may be placed numerals, figures, or any other desirable symbols, such as are ordinarily employed in permutation-locks, and the combination for the manipulation of the parts of the lock mechanism being according to the holes selected in the disk $k$ and ring $k^4$ for the reception of the ends $o^4$ and $o^7$ of the respective pins $o^2$ and $o^5$, as will be clearly understood.

When all the parts of the lock mechanism have been assembled and the combination having been properly determined, then the arm $g^4$ of the pin or bolt $g$, as has been previously stated, lies in the cut-away part $l^2$ of the plate $l$, and by turning the disk $o$ and ring $o'$ to either right or left, and thereby by means of the connecting studs or pins $o^2$ and $o^5$ causing a like movement of the disk $k$ and ring $k^4$, the cut-away parts or openings in said disk and ring will be moved to another position beneath the plate $l$, and the said arm is held in place within the part $l^2$ of the plate $l$ with the lower end of the pin or bolt $g$ out of its disengaged position with the opening $b^2$ in the tube $b$, and the parts of the bicycle or other vehicle can be freely used. When, however, the disk $o$ and ring $o'$ are set to the proper combination, so as to bring the various cut-away or open portions in the plate $l$, disk $k$, ring $k^4$, and disk $e$ in alinement, then the arm $g^4$ of the post $g$ can be forced from the opening in disk $l$ through the openings in disk $k$ and ring $k^4$ into the opening in the disk $e$, whereby the end of said pin or bolt $g$ is caused to enter the opening $b^2$ in the tube $b$, and by once more turning the disk $o$ and ring $o'$, and in consequence the disk $k$ and ring $k^4$, the arm $g^4$ will be held in the opening in the disk $e$, while the end of the pin or bolt $g$ will hold the tubular parts $b$ and $a$ in locked positions to prevent the steering of the vehicle.

When the combination is again set and the various openings in the plate $l$, disk $k$, ring $k^4$, and disk $e$ are again brought in alinement, then the spring on the post or bolt $g$ will cause the disengagement of said post or bolt with the tube $b$, and the arm $g^4$ will again assume the position indicated in Fig. 7, in which it can be retained by once more operating the disk $o$ and ring $o'$ and disk $k$ and ring $k^4$ in the manner hereinabove described.

In Figs. 15 and 16 I have illustrated a different fastening means for attaching the lock-casing to the head $a$ of the bicycle or other like vehicle.

In this construction the casing $c$ is provided with a yoke $c^{12}$, which is made to fit half-way around the head of the vehicle and has a pair of screw-threaded sockets $c^8$, and $c^9$ is another yoke which can be made to fit around the remaining half of the head $a$ and has a pair of perforated sockets $c^{10}$, in which are arranged certain fastening-screws $c^{11}$, the ends of which are screwed into the sockets $c^{12}$ for securely arranging these several parts in position on the head of the frame of the vehicle, as will be clearly understood.

From the above description it will be seen that I have devised a simple, neat, and inexpensive device which is operative and fully adapted for all the purposes specified.

Of course I am aware that changes may be made in the several arrangements and combinations of the parts, as well as in the details of the construction thereof, without departing from the scope of my present invention. Hence I do not limit my invention to the exact arrangements and combinations of the parts as herein described and illustrated, nor do I confine myself to the exact details of the construction of such parts.

Having thus described my invention, what I claim is—

1. A bicycle-lock, adapted to be attached to the head of the vehicle and lock with the fork-tube, consisting, essentially, of a casing, a lock mechanism arranged in said casing, a bolt or pin slidingly arranged in said casing, an arm extending at a right angle, or approximately so, from said bolt or pin, a slotted sleeve in which said bolt or pin is slidably arranged, a fixed disk in said casing, having a pair of circular slots or openings, a concentrically-arranged disk and ring, both having holes or perforations, said disk and ring being movably placed on the lower side of said fixed disk, a concentrically-arranged disk and ring movably placed on the upper side of said fixed disk, a stud or post connected with each upper disk and upper ring, the upper end of each stud or post forming a finger-piece and the lower portions of said studs or posts, each extending through one of the circular slots or openings in said fixed disk and into a hole or perforation in the lower disk and ring, for moving the latter disk and ring by the movement of the upper disk and ring, all of said disks and rings being arranged concentric with the said sleeve around the bolt or pin, and each disk or ring having a radially-arranged opening or slot in which, when said slots are arranged in corresponding positions, said arm on said bolt or pin is movably arranged, substantially as and for the purposes set forth.

2. A bicycle-lock, adapted to be attached to the head of the vehicle and lock with the fork-tube, consisting, essentially, of a casing, a lock mechanism arranged in said casing, a bolt or pin slidably arranged in said casing, an arm extending at a right angle, or approximately so, from said bolt or pin, a back disk $e$ provided with a slot or opening $e^4$, a pair of concentric rings $f$ and $i$, and means connected with said rings for securing them upon said disk $e$, and a series of disks and rings arranged concentric with the central axis of said bolt or pin, and each disk and ring having a radially-arranged opening or slot, in which, when said slots are arranged in corresponding positions, said arm on said bolt or pin is movably arranged, substantially as and for the purposes set forth.

3. A bicycle-lock, adapted to be attached to the head of the vehicle and lock with the fork-tube, consisting, essentially, of a casing, a bolt or pin slidably arranged in said casing, an arm extending at a right angle, or approximately so, from said bolt or pin, a slotted sleeve in which said bolt or pin is slidably arranged, a back disk $e$ provided with a slot or opening $e^4$, a pair of concentric rings $f$ and $i$, and means connected with said rings for securing them upon said disk $e$, a fixed disk in said ring $i$, a concentrically-arranged disk and ring movably placed on the lower side of said fixed disk, a concentrically-arranged disk and ring movably placed on the upper side of said fixed disk, means connecting the upper disk and ring, with said lower disk and ring, for moving the latter disk and ring by the movement of the upper disk and ring, all of said disks and rings being arranged concentric with the said sleeve around the bolt or pin, and each disk and ring having a radially-arranged opening or slot, in which, when said slots are arranged in corresponding positions, said arm on said bolt or pin is movably arranged, substantially as and for the purposes set forth.

4. A bicycle-lock, adapted to be attached to the head of the vehicle and lock with the fork-tube, consisting, essentially, of a casing, a bolt or pin slidably arranged in said casing, an arm extending at a right angle, or approximately so, from said bolt or pin, a slotted sleeve in which said bolt or pin is slidably arranged, a back disk $e$ provided with a slot or opening $e^4$, a pair of concentric rings $f$ and $i$, and means connected with said rings for securing them upon said disk $e$, a fixed disk in said ring $i$, having a pair of circular slots or openings, a concentrically-arranged disk and ring, both having holes or perforations, said disk and ring being movably placed on the lower side of said fixed disk, a concentrically-arranged disk and ring movably placed on the upper side of said fixed disk, a stud or post connected with each upper disk and upper ring, the upper end of each stud or post forming a finger-piece and the lower portions of said studs or posts, each extending through one of the circular slots or openings in said fixed disk and into a hole or perforation in the lower disk and ring, for moving the latter disk and ring by the movement of the upper disk and ring, all of said disks and rings being arranged concentric with the said sleeve around the bolt or pin, and each disk or ring having a radially-arranged opening or slot in which, when said slots are arranged in corresponding positions, said arm on said bolt or pin is movably arranged, substantially as and for the purposes set forth.

5. In a bicycle-lock, the combination, with a casing, of a disk $e$ having a central opening, and radially-arranged lug or tongue $e^3$, a sleeve $h$, having a groove into which said tongue $e^3$ extends, having holding tongues or lugs $h^2$ on said sleeve $h$ in holding engagement with said disk $e$, and having a slot $h^3$, a pin or bolt slidably arranged in said sleeve, an arm on said pin or bolt projecting at a right angle therefrom, or approximately so, through said slot 5 $h^3$ into the casing, and a permutation-lock mechanism in said casing, substantially as and for the purposes set forth.

In testimony that I claim the invention set forth above I have hereunto set my hand this 25th day of September, 1899.

JAMES C. BIOREN.

Witnesses:
FREDK. C. FRAENTZEL,
HARRY MARTIN.